March 8, 1949.  H. DIETZ  2,463,857
PRECISION CHUCK
Filed May 24, 1945  3 Sheets-Sheet 1
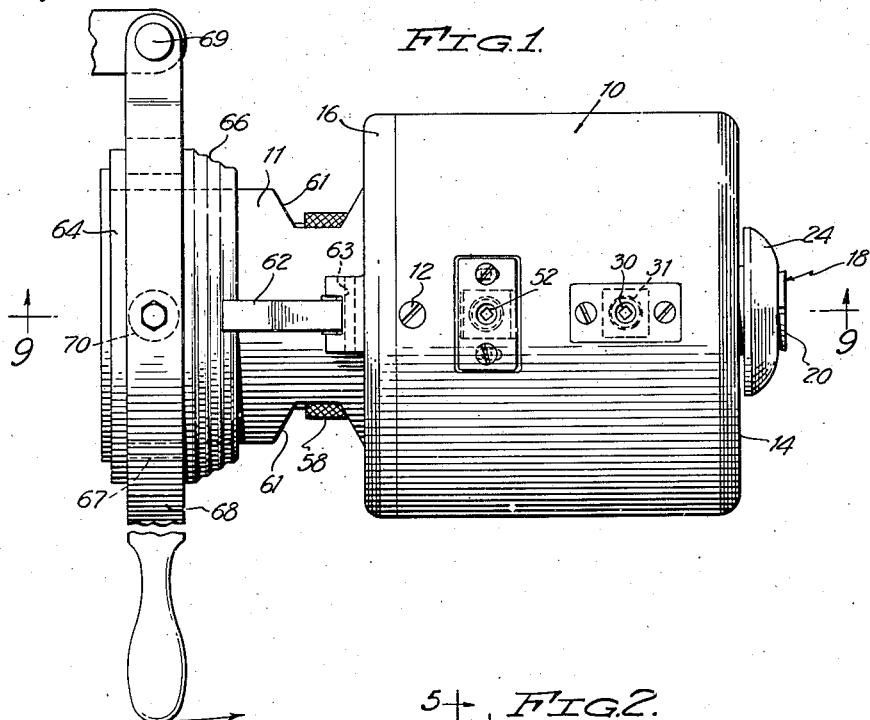
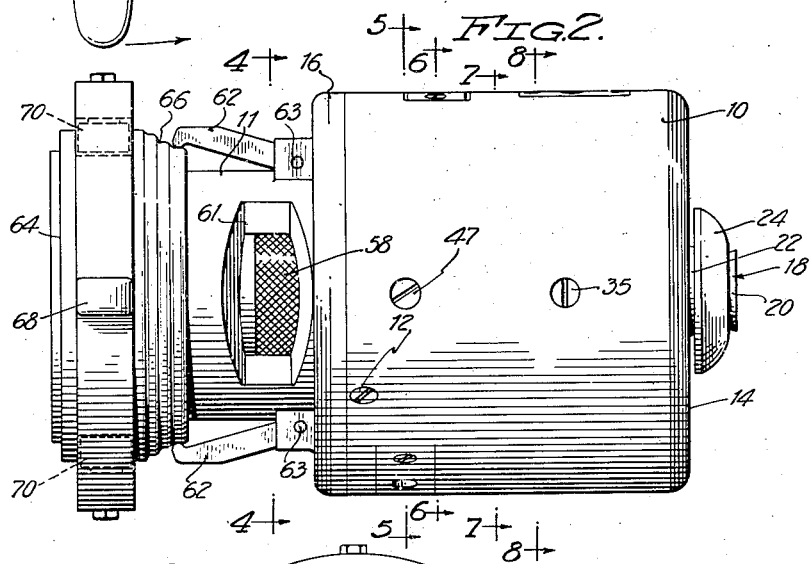
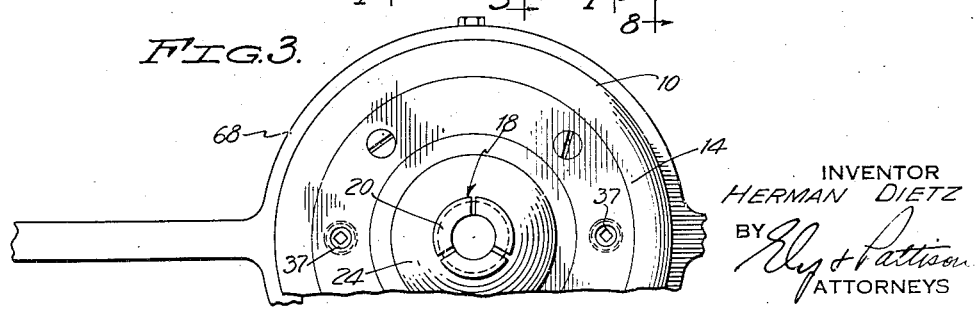
INVENTOR
HERMAN DIETZ
BY
ATTORNEYS March 8, 1949. H. DIETZ 2,463,857
PRECISION CHUCK
Filed May 24, 1945 3 Sheets-Sheet 2

INVENTOR
HERMAN DIETZ
BY
ATTORNEYS

March 8, 1949.  H. DIETZ  2,463,857
PRECISION CHUCK
Filed May 24, 1945  3 Sheets-Sheet 3
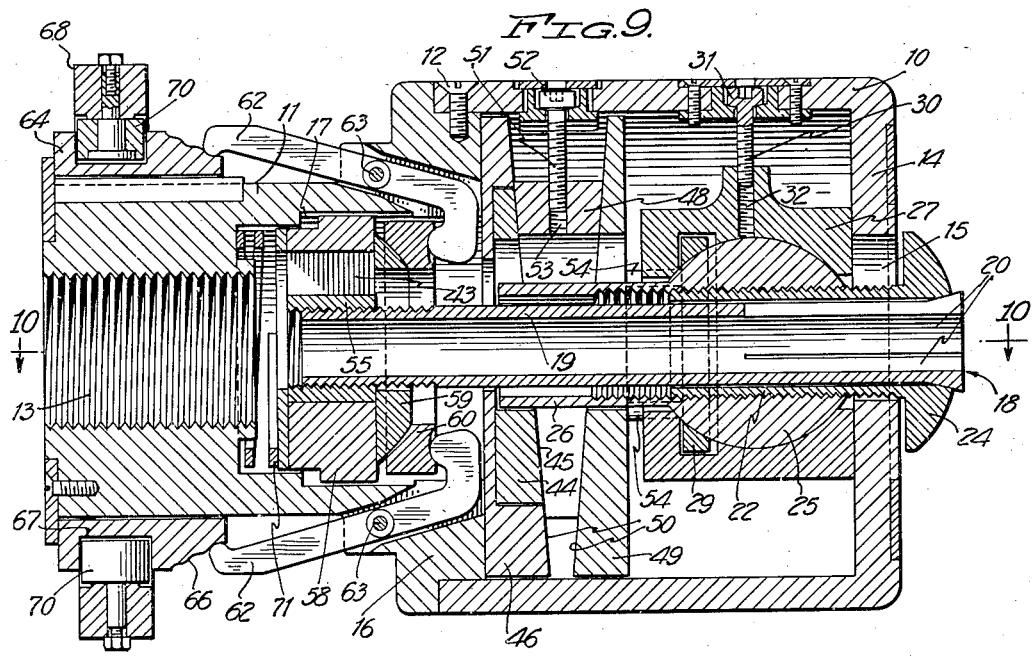
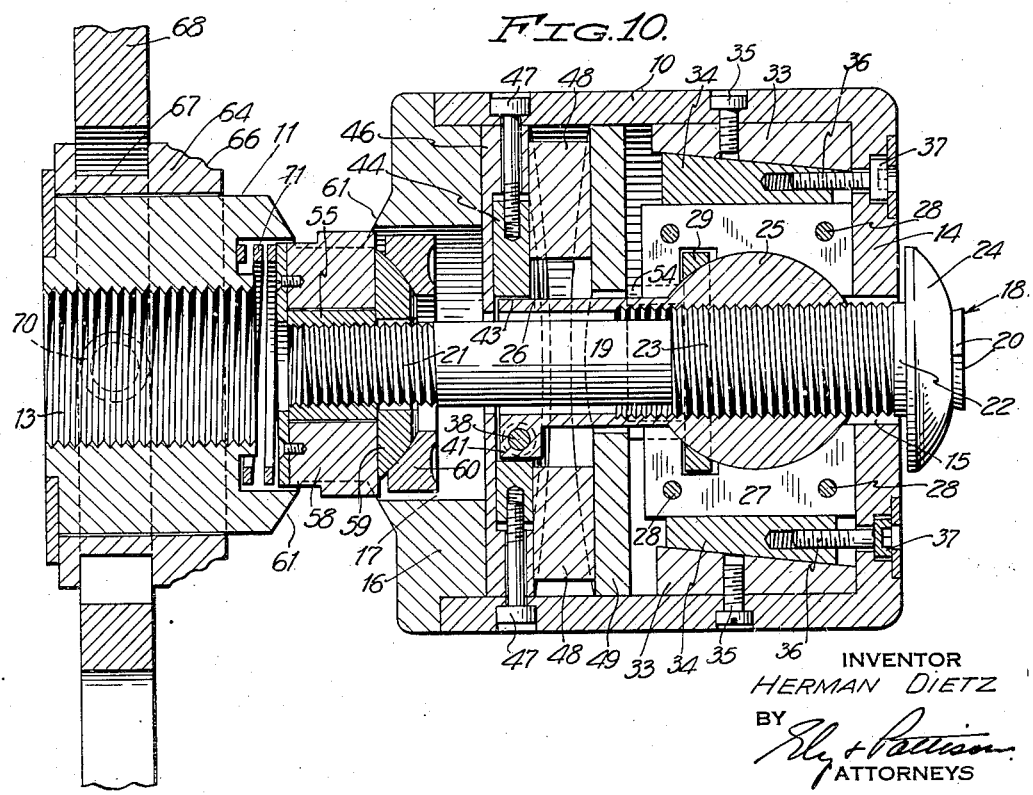
INVENTOR
HERMAN DIETZ
BY
ATTORNEYS Patented Mar. 8, 1949

2,463,857

UNITED STATES PATENT OFFICE 2,463,857

PRECISION CHUCK

Herman Dietz, Astoria, N. Y.

Application May 24, 1945, Serial No. 595,599

13 Claims. (Cl. 279—6)

This invention relates to a precision chuck which is designed and adapted for lining up stud and collet work true to the lathe.

The principal object of the invention is the provision of a chuck of the indicated character for producing accurately machined pieces of work.

A further object of the invention is the provision of a chuck of the indicated character embodying novel features of construction and operation whereby pieces of work, such as stud and collet work, may be machined accurately by lining up the same truly with respect to the axis of rotation of the spindle of a machine tool or lathe in a minimum of time, to increase production with a corresponding reduction in cost.

With the foregoing, other objects of the invention will appear when the following specification is read in conjunction with the accompanying drawings, in which, Figure 1 is a top plan view of a chuck embodying the features of the present invention.

Figure 2 is a side view.

Figure 3 is a front end view, portions being broken away.

Figure 4:
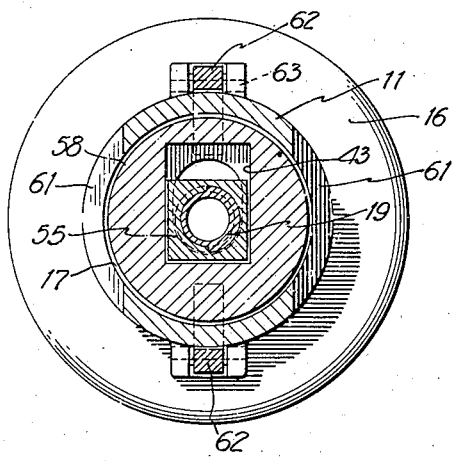

Figures 4, 5, 6, 7 and 8 are transverse sectional views taken on the lines 4—4, 5—5, 6—6, 7—7, and 8—8, respectively.

Figure 9 is a longitudinal sectional view taken on the line 9—9 of Figure 1.

Figure 10 is a longitudinal sectional view taken on the line 10—10 of Figure 9.

Referring now more particularly to the drawings it will be apparent the chuck of the present invention includes a rotary body in the form of a cylindrical housing 10 having an adapter 11 secured to the rear end, as at 12. The adapter 11 is secured in axial alinement in its relation to the housing and has a central threaded bore 13 therein by virtue of which the chuck is attached to or mounted upon a rotary spindle of a lathe, so as to rotate therewith.

The housing 10 has a front wall 14 having a central opening 15 therein. The adapter 11 provides a rear wall 16 for the housing 10 and said wall 16 has a central opening 17 therein.

A suitable work holder is provided. It consists of a collet 18 designed to be secured within the housing 10, by reason of the openings 15 and 17, to line up the work either centralized or off center with respect to the axis of rotation of the chuck and the lathe spindle upon which the chuck is mounted. In the present instance the collet 18 is adapted to receive stock three quarters of an inch or less fed through the spindle without stopping the lathe.

The collet 18 includes a tubular part or member 19 of suitable length having resilient jaws 20 on the front end. The rear end of the member 19 is externally threaded, as at 21. The jaws 20 are adapted to be closed to grip the work and are self-opening when disengaged to release the work. A sleeve 22 loosely surrounds the member 19. This sleeve 22 is externally threaded as at 23, and has a head 24 which cooperates with the jaws 20 to close them when the member 19 is moved axially rearward and allows said jaws to open when moved axially forward. A ball 25 has a central threaded bore extending therethrough so as to be threaded on the sleeve 22 to support the collet 18 for certain adjustments. The ball 25 has an axial tubular extension 26 constituting a sleeve which surrounds the member 19. The ball is held in a piloting socket or housing 27 composed of two parts bolted together as at 28, said housing parts constituting bearings supporting the ball 25 for turning movement. The parts of the housing 27 are grooved to loosely receive a clamping ring 29 which may bear against the ball 25 to secure it against movement with respect to the housing 27.

The front end of the work holder is adjustable up and down or radially in one plane. This is accomplished by a headed screw 30 connected with the cylindrical wall of the housing 10 so that the screw is held against axial movement, but allowed to have a small amount of lateral movement. The connection of the screw 30 to the housing 10 is designated 31. The screw 30 is loosely mounted in the support 31 as indicated in Figure 9. The inner end of the screw 30 is in threaded engagement with the ball housing 27 as at 32. The housing 27 is rectangular and small enough to be disposed for movement within the front end of the outer housing 10 in contact with the wall 14.

The work holder is also adjustable sidewise or in a second plane which intersects at a right angle the plane in which up and down adjustment is effected by the screw 30. The sidewise adjustment is accomplished by a pair of tapered or wedge-shaped plates 33 and 34, respectively, on both sides of the housing 27. Each of the plates 33 is secured to the cylindrical wall of the housing 10 by a screw 35. Each of the plates 34 is adjustable by means of a headed screw 36 connected, as at 37, with the wall 14 for rotation but held against axial movement.

Figure 5:
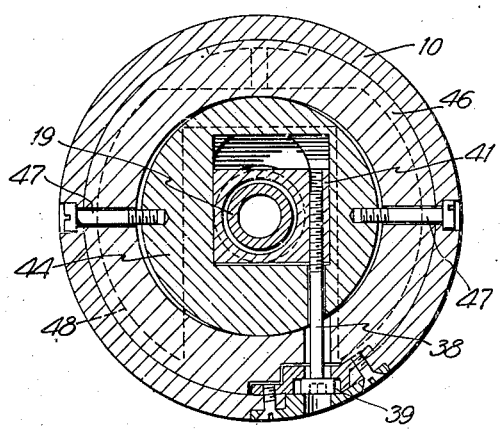
Figure 6:
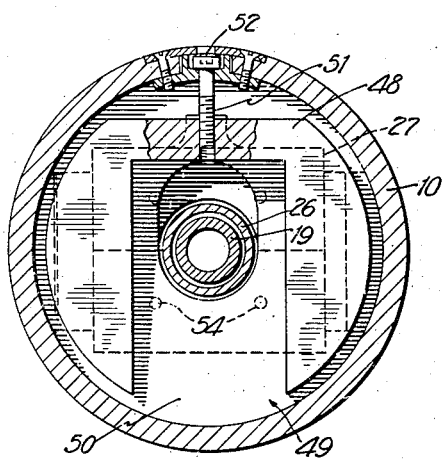
Figure 7:
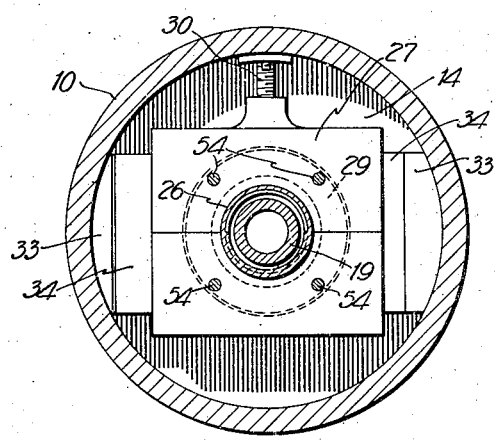
Figure 8:
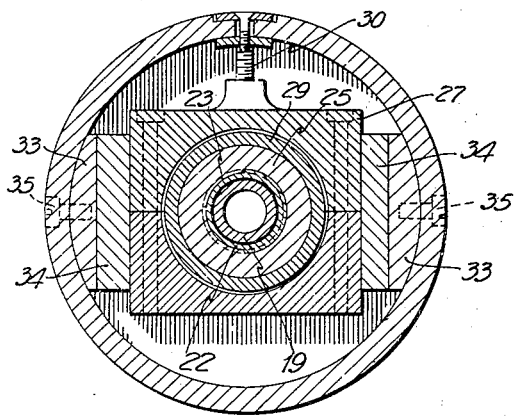

The ball 25 mounts the head or front end of the work holder for a small amount of pivotal movement so that the work holder may be given angular adjustments with respect to the axis of rotation of the chuck in attaining the final setting of the work piece. This angular adjustment is accomplished by a headed screw 38 connected, as at 39, with the cylindrical wall of the housing 10 for rotation, but held against axial movement as shown in Figure 5. The screw 38 is in threaded engagement, as at 40, with the squared end 41 of the sleeve 26 integral with the ball 25. The end 41 is disposed in a slot 43 in a circular plate 44 having a beveled face 45. The collet member 19 projects loosely through the sleeve 26 with sufficient clearance to allow tilting or canting, yet enabling the block 40 to act on the member 19 to move the inner end of said member 19 radially up and down. The end 40 has guided movement in the plate 44. This plate 44 is received in a circular recess in a ring 46 fitting in the housing 10 and secured in place thereto by screws 47. These screws 47 also secure the plate 44 in fixed position, as shown in Figure 5.

After the work is chucked in the work holder or collet 18 and the latter is moved into the desired adjusted position, the collet is tightly secured in said position. This is accomplished by a bifurcated tapered or wedge shape plate 48 movable between the plate 44 and ring 46 on one side and a slotted disk 49 on the opposite side. The ring 46 and the disk 49 each has a beveled face 50 complemental to the plate 48. The plate 48 is movable up and down or radially by means of a screw 51 connected with the cylindrical wall of the housing 10, as at 52, for rotation but held against axial movement. The screw 51 is in threaded engagement with the plate 48 as at 53. The disk 49 fits loosely in the housing 10 so as to be capable of axial movement. The disk 49 bears on a set of loose pins 54 supported by the ball housing 27 to bear on the clamping ring 29. When the screw 51 is manipulated, the plate 48 taking purchase on the plate 44, exerts pressure on the disk 49, causing the latter to push the pins 54 forwardly. This causes the pins 54 in turn to press the clamping ring 29, to clamp the ball 25 against the bearing surface of the housing 27, and so tightly secure the work holder or collet 18 in the adjusted position accurately lined up to the lathe for the performance of the desired cutting or milling operations, as the case may be.

It will be understood from the foregoing that the work holder consisting of the tubular member 19 and the jaws 20 may be adjusted to a position centralized with respect to the axis of rotation of the lathe spindle; that the work holder may be offset with respect to said axis of rotation or be parallel thereto, and that said work holder may be set at an angle with respect to said axis of rotation.

The manner in which the work holder is locked or secured in the desired adjusted position has been set forth above. However, before the work holder is secured in the adjusted position, the collet is made to grip the work piece by moving the member 19 axially in a rearward direction. This is accomplished by suitable means, and a practical form for this purpose is as follows. An adjustment square nut 55 is in threaded engagement with the threads 21 on the tail end of the member 19. The nut 55 has clearance in a slot 57 in a knurled knob 58. The nut 55 is turnable with the knob 58. A rounded and slotted swivel 59 bears on the knob 58, and thrust ring 60 bears on the swivel 59. The member 19 extends through the swivel 59 and the ring 60, as shown in Figures 9 and 10. The swivel 59 bears on the nut 55.

The knob 58 may rock slightly by reason of the swivel 59 and the clearance between the nut 55 and the knob 58. This knob 58 may be turned to give a vernier adjustment of the gripping action of the jaws 20 in accordance with the cross sectional size of the work received in the work holder. The adapter 11 has openings 61 therein diametrically opposite each other to enable the manipulation of the knob 58. Levers 62 fulcrumed, as at 63, on the adapter 11, are interposed between the ring 60 and a collar 64 loosely splined, as at 65, on the adapter 11. The inner ends of the levers 64 bear on the ring 60 and their outer ends bear on a stepped cam formation 66 on the collar 64. The collar 64 has a circular groove 67 therein. A shift lever 68 is fulcrumed at one end, as at 69, on a fixed part of the lathe. Rollers 70 carried by the lever 68 are arranged diametrically opposite each other and are received in the groove 67. A helical compression spring 71 is interposed between the knob 58 and the inner wall of the adapter 11 to move the collet outwardly to release the work held therein.

By operating the lever 68 to the right as viewed in Figure 1, the work holding member 19 will be moved axially rearward through the intervention of the levers 62, ring 60, swivel 59, and nut 55. This will cause the jaws 20 to be cammed inwardly by the head 24 to grip the work. The gripping action of the jaws 20 may be varied according to the cross sectional size of the work, by moving the lever 68 more or less, to select the particular step of the formation 66 to effect the required closing of the collet 18. When the lever 68 is returned to its neutral position the spring 71 returns the member 19 and thus opens the collet 18 to release the work piece.

The adjusting screws 30, 36, 38 and 51 may be manipulated from the exterior of the housing 10 and each is capable of micro adjustments readable on suitable indicators or dial on the housing.

Having thus described my invention, what I claim as new and desire to secure by Letters Patent, is:

1. A chuck including a rotatable body, a work holding member in the body, means in said body connected with said member to adjust said end in one direction at right angles to the axis of rotation of said body, means cooperating with said first means to angularly adjust said member in another direction with respect to said axis, and means in said body for tilting said member with respect to said axis.

2. A chuck including a rotatable hollow body, a collet for holding the work carried by said body, said collet including a cylindrical sleeve disposed within said body, means whereby the sleeve may be moved sidewise to centralize the work held by the collet with respect to the axis of rotation of the body, means to move said sleeve to open and close the collet, and means in said body for tilting said member with respect to said axis.

3. A chuck as set forth in claim 2, wherein said last means includes an adjustable nut on said sleeve.

4. A chuck comprising a rotary housing, a work holder having means adapted to grip and release the work, said work holder projecting into said housing, means connected with the housing and work holder to change the position of the work holder in directions at right angles to each other with respect to the axis of rotation of the chuck, means to operate said first means to grip and release the work, and means connected with the housing and work holder to secure the work holder in the adjusted position, and means in said housing to tilt the holder with respect to said axis.

5. A chuck as set forth in claim 4, wherein said work holder includes a tubular member to receive the work, and a ball through which said member extends centrally thereof, said ball being fixed to said member and enabling slight rocking movement of said member in adjusting the work holder.

6. In a chuck, a rotary housing, a socket arranged for adjustment within the housing, means to secure the socket in an adjusted position, a ball arranged in the socket, a work holder extending coaxially of the ball and secured thereto, means to adjust the holder in directions at right angles to each other with respect to the socket by virtue of said ball, and means to clamp the ball in the socket to secure the holder in the desired position of adjustment, and means in said housing to tilt the holder with respect to said axis.

7. In a chuck as set forth in claim 6, wherein said second means is connected with said housing and the ball and operable from the exterior of the housing.

8. In a chuck an outer rotary housing, a work holding tubular member, a ball through which said member extends centrally thereof, said ball being fixed to said member near one end thereof, an inner housing supported within the outer housing for movement in planes at right angles to each other, said inner housing having bearing means to support said ball for slight rocking adjusting movement with respect to the housing, means connected with said housings to adjust the inner housing in one of said planes, means interposed between said housings to adjust the inner housing in the other one of said planes, and means interposed between the outer housing and said ball to clamp the ball to the bearing means to keep the tubular member from moving with respect to the inner housing.

9. A chuck including a rotatable body, a work holding member in the body, means connected with said member to adjust said member in one direction at right angles to the axis of rotation of said body, means cooperating with said first means to angularly adjust said member in another direction with respect to said axis, said first means including an adjustable housing having bearing means, and a ball through which the work holding member extends, said ball being turnable in said bearing.

10. A chuck including a rotatable body, a work holding member in the body, means connected with said member to adjust said member in one direction at right angles to the axis of rotation of said body, means cooperating with said first means to angularly adjust said member in another direction with respect to said axis, said work holding member being axially movable and consisting of a sleeve having resilient work engaging and releasing jaws thereon, means to cooperate with said jaws to open and close them in response to the axial movement of the sleeve, and means to cause axial movement of the sleeve for the purpose stated.

11. A chuck including a rotatable body, a work holding member in the body, means connected with said member to adjust said member in one direction at right angles to the axis of rotation of said body, means cooperating with said first means to angularly adjust said member in another direction with respect to said axis, said first means including an adjustable socket and a ball through which the work holding member extends, said ball being turnable in said socket, and means to secure said ball against movement with respect to said socket.

12. A chuck including a rotatable body, a work holding member in the body, means connected with said member to adjust said member in one direction at right angles to the axis of rotation of said body, means cooperating with said first means to angularly adjust said member in another direction with respect to said axis, said work holding member being axially movable and consisting of a sleeve having resilient work engaging and releasing jaws thereon, means to cooperate with said jaws to open and close them in response to the axial movement of the sleeve, and means to cause the axial movement of the sleeve for the purpose stated.

13. In a chuck, a rotary housing, a socket arranged for adjustment within the housing, means to secure the socket in an adjusted position, a ball arranged in the socket, a work holder extending coaxially of the ball and secured thereto, means to adjust the holder in directions at right angles to each other with respect to the socket by virtue of said ball, and means to clamp the ball in the socket to secure the holder in the desired position of adjustment, said last means including a loose clamping ring in the socket and positioned to clamp the ball in conjunction with the socket to secure the work holder.

HERMAN DIETZ.

REFERENCES CITED

The following references are of record in the file of this patent:

UNITED STATES PATENTS

| Number | Name | Date |
| --- | --- | --- |
| 450,234 | Johnson | Apr. 14, 1891 |
| 779,047 | Kempter | Jan. 3, 1905 |
| 1,256,131 | Hervig | Feb. 12, 1918 |
| 1,428,754 | Carr | Sept. 12, 1922 |
| 1,677,889 | Gairing | July 24, 1928 |
| 2,262,849 | Knecht | Nov. 18, 1941 |